United States Patent [19]

Cerny

[11] 4,153,758
[45] May 8, 1979

[54] HEARING AID BATTERY HOLDER
[75] Inventor: Elmer J. Cerny, Des Plaines, Ill.
[73] Assignee: Beltone Electronics Corporation, Chicago, Ill.
[21] Appl. No.: 915,888
[22] Filed: Jun. 15, 1978
[51] Int. Cl.² ............................................ H04R 25/00
[52] U.S. Cl. ...................................... 429/98; 429/100; 179/107 R
[58] Field of Search ........................ 179/107, 178, 179; 429/98, 100

[56] References Cited
U.S. PATENT DOCUMENTS

| | | | |
|---|---|---|---|
| 2,523,354 | 9/1950 | Butler | 179/107 S |
| 2,975,226 | 3/1961 | Lehr | 179/107 R |
| 3,062,911 | 11/1962 | Joy | 179/107 S |
| 3,170,046 | 2/1965 | Leale | 179/107 E |
| 3,265,819 | 8/1966 | Herrmann | 179/107 E |
| 3,475,566 | 10/1969 | Bauer | 179/107 H |
| 4,107,400 | 8/1978 | Grohoski | 429/98 |

Primary Examiner—George G. Stellar
Attorney, Agent, or Firm—Allegretti, Newitt, Witcoff & McAndrews

[57] ABSTRACT

A combined package and carrier for a hearing aid battery adapted to securely hold and uniquely position the battery within the holder and the hearing aid and yet provide as small as possible a package. A carrier of molded plastic and functioning as a handle to insert and withdraw the battery from the hearing aid.

7 Claims, 4 Drawing Figures

U.S. Patent May 8, 1979 4,153,758
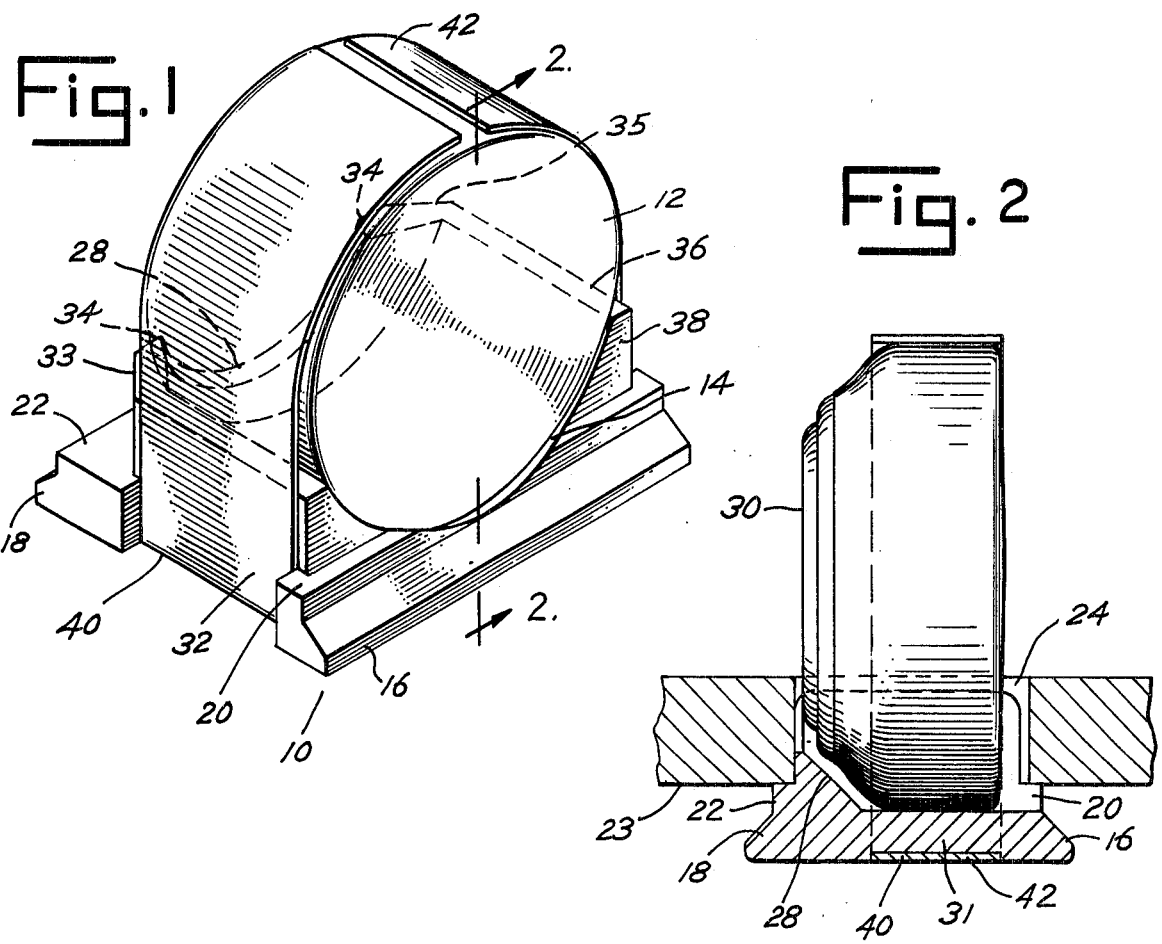
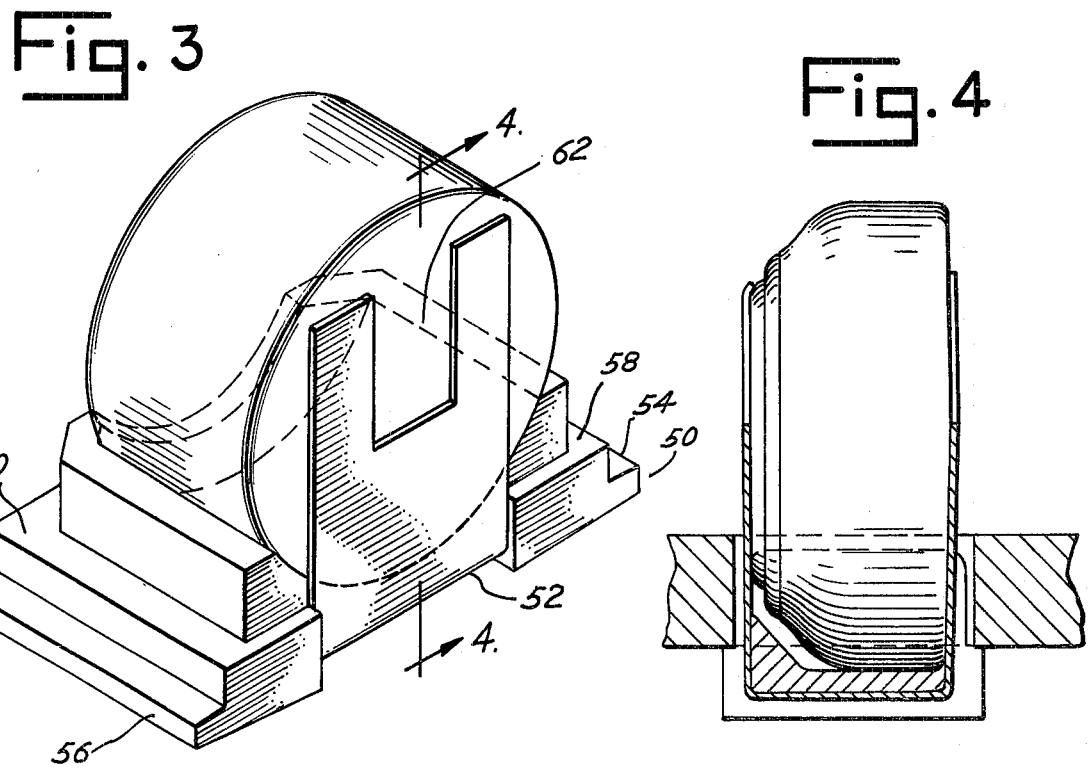

HEARING AID BATTERY HOLDER

BACKGROUND OF THE INVENTION

Previous holders for hearing aid batteries of which applicant is aware completely encapsulate the battery around at least its entire curved surface. While generally efficient and useful for the purpose intended, this manner of holding the battery added significantly to the net effective diameter of the battery package which was inserted into a battery door in the hearing aid. This is undesirable since the hearing aid must be as small as possible to achieve manufacturing economy, particularly in all in-the-ear hearing aids. In addition, the small size leads to better aesthetics and comfort in general.

BRIEF SUMMARY OF THE INVENTION

This invention is directed to an improved packing piece and holder for a hearing aid battery. The invention includes a single molded plastic battery carrier adapted to be partially inserted into a battery door of a hearing aid. The battery includes an arcuate battery receiving bed with a radius of curvature substantially conforming to the radius of curvature of the cylindrically shaped hearing aid battery. The arcuate bed extends substantially less than 180 degrees around the battery. Flange handles are provided extending outwardly from opposite sides of the arcuate bed and are adapted to be grasped by a user. Shoulder portions are provided on opposite sides of the arcuate bed and are adapted to abut against the exterior surface around the battery door and to hold the flange handles apart from and out of contact with the exterior surface adjacent the battery door to facilitate gripping by the user. A lip extends radially inwardly along one curved surface of the arcuate bed so as to uniquely orient the battery in the carrier. A means for attaching the battery to the carrier is also provided. In one alternative embodiment, the means for attaching the battery to the carrier is glue. In a second alternative embodiment, tape is wound about the battery and the carrier. In this alternative a recess is defined in the bottom of the carrier below the arcuate bed and adapted to provide a channel for the tape wound about the carrier and battery.

Accordingly, a principal object of the present invention is to provide a hearing aid battery carrier which will securely and efficiently hold the battery and yet which will be as small as possible. Another object of the present invention is to provide a holder for the battery which will uniquely position the battery so as to define the polarity of the battery.

Still a further object of the present invention is to provide a battery carrier which can be inserted into the battery door of the hearing aid in only the correct orientation so as to maintain correct polarity of the battery within the hearing aid.

BRIEF DESCRIPTION OF THE DRAWINGS

There follows a brief description of the drawings wherein like numerals refer to like elements and wherein:

FIG. 1 is a perspective view of one preferred embodiment of the present invention;

FIG. 2 is a side cross-sectional view of the hearing aid battery carrier of FIG. 1 inserted in the hearing aid battery door;

FIG. 3 is a perspective view of a second preferred embodiment of the present invention; and FIG. 4 is a side cross-sectional view of the second preferred embodiment of the present invention shown in FIG. 3 with the battery and carrier inserted in the hearing aid battery door.

DETAILED DESCRIPTION OF THE PREFERRED EMBODIMENTS

Referring now to FIGS. 1 and 2, a molded plastic carrier 10 is shown adapted to receive a cylindrical hearing aid battery 12. The molded plastic carrier 10 includes an arcuate bed 14 adapted to receive the battery 12 and having a radius of curvature substantially conforming to the radius of curvature of the battery 12. The arcuate bed 14 extends approximately 120 degrees, which is substantially less than 180 degrees around the battery. This permits the maximum effective width of the battery and carrier to be defined by the battery alone.

Flange handles 16 and 18 are adapted to be grasped by a user when installing or removing the battery from the hearing aid. The carrier 10 also includes shoulder portions 20 and 22 which also extend on opposite sides of the arcuate bed 14. In this embodiment, the shoulder portions 20 and 22 are substantially parallel, adjacent to and slightly above the flange handles 16 and 18 respectively. The shoulder portions are adapted to abut against the exterior surface 23 of a battery door 24 formed in a hearing aid (not shown). A lip 28 extends radially inwardly along one curved edge of the arcuate bed 14. The lip 28 nests the tapered positive pole 30 of the battery 12 and serves to uniquely orient the battery 12 within the carrier 10.

The carrier 10 includes a bottom support portion 31 located below the arcuate bed 14. Wall members 32, 34, 36 and 38 extend upwardly from the bottom support portion 31 and define a cross-section complementary to the opening provided by the battery door 24. Angled wall members 33 and 35 also extend upwardly from the bottom support portion 31. Angled wall member 33 connects the end portions of wall members 32 and 34 at a 45 degree angle in relation to each. The angled wall members 33 and 35 cooperate with the battery door opening 24, to allow the holder 10 to be inserted into the door 24 in one and only one orientation. This is done by forming the wall members to have a cross-section complementary with that of hearing aid door 24. Since the cross section of wall members 32, 34, 36 and 38 is asymmetric about one axis, the carrier 10 can be inserted into the door 24 in one and only one orientation. Thus, the correct polarity of the battery in the hearing aid is insured.

A means for attaching the battery 12 to the carrier 10 is provided and may take any number of alternative forms. In the first alternative, glue may be placed in the arcuate bed 14 between the arcuate bed 14 and the hearing aid battery 12. Alternatively, tape 42 may be wound about the circumference of the battery and the carrier 10 in a channel 40 defined in the bottom support portion 31 of carrier 10 so as to secure the battery 12 to the carrier 10.

Referring now to a second preferred embodiment shown in FIGS. 3 and 4, the carrier 50 is substantially identical to carrier 10 except for the orientation of the channel 52 and the flange handles 54 and 56 and shoulder portions 58 and 60. In the case of the embodiment shown in FIGS. 3 and 4 the shoulder portions 58 and 60 and flange handles 54 and 56 have been rotated by an angle of 90 degrees in relation to the arcuate bed 14 from the position of these elements in the first preferred embodiment of FIGS. 1 and 2. Also, with the carrier 50 of FIGS. 3 and 4 the tape is of modified configuration. In particular, a gap 62 should be left in the tape on both sides of the battery 12 in order to permit electrical contact of the hearing aid power circuit (not shown) with the battery 12.

While in the foregoing there have been described presently preferred embodiments of the present invention, it is to be understood that these embodiments are merely illustrative of the invention. Other embodiments may be made without departing from the true spirit and scope of this invention.

What is claimed is:

1. A single molded plastic battery carrier adapted to be partially inserted into a battery door of a hearing aid comprising;
    a bottom support portion;
    wall members extending upwardly from the bottom support portion with the wall members defining a cross-section complementary to the opening provided by the battery door and adapted to be inserted into the battery door;
    a battery receiving bed above the bottom support portion having a surface adapted to receive a hearing aid battery about less than 50% of the circumference of the battery;
    flange handles entending on opposite sides of the bottom support portion adapted to be grasped by the user;
    shoulder portions adjacent to said flange handles and terminating at the said walls, the shoulder portions extending outwardly from the said walls whereby the shoulder portions abut the exterior surface adjacent the battery door of the hearing aid; and
    means for fastening the battery to the battery carrier;
    whereby the size of the battery door need only be slightly larger than the effective cross-section of the battery inserted therethrough.

2. The invention as set forth in claim 1 wherein the means for attachment is glue located between the battery receiving bed and the battery.

3. The invention as set forth in claim 1 wherein the means for attaching the battery is tape wound around the battery and the carrier and wherein the carrier includes a recess defined in the bottom support portion adapted to provide a channel for the wound tape.

4. A molded plastic carrier for a cylindrically shaped hearing aid battery, the carrier adapted to be partially inserted into a battery door of a hearing aid, the carrier having:
    an arcuate battery receiving bed with a radius of curvature substantially conforming to the radius of curvature of the battery, the arcuate bed extending substantially less than 180 degrees around the battery;
    flange handles extending outwardly from opposite sides of the arcuate bed and adapted to be grasped by a user;
    shoulder portions on opposite sides of the arcuate bed adapted to abut against the exterior surface of the hearing aid adjacent the battery door;
    a lip extending radially inward along one curved surface of the arcuate bed so as to uniquely orient the battery in the carrier; and
    means for attaching the battery to the carrier.

5. The invention as set forth in claim 4 wherein the means for attachment is glue located between the arcuate bed and the battery.

6. The invention as set forth in claim 4 wherein the means for attaching the battery is tape wound around the battery and wherein the carrier includes a recess defined in the bottom of the carrier below the arcuate bed and adapted to provide a channel for the wound tape.

7. The invention as set forth in claim 4 wherein means are provided on the carrier to uniquely locate the carrier within the battery door in one and only one compatible position.

* * * * *